United States Patent
Hirai et al.

(10) Patent No.: US 8,425,379 B2
(45) Date of Patent: Apr. 23, 2013

(54) POWER TRANSFER MECHANISM CONTROL DEVICE AND POWER TRANSFER DEVICE

(75) Inventors: Nobuyuki Hirai, Anjo (JP); Tetsuya Shimizu, Anjo (JP); Kenichi Tsuchida, Hagu-gun (JP); Kazunori Ishikawa, Toyota (JP); Atsushi Ishibashi, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 338 days.

(21) Appl. No.: 13/011,281

(22) Filed: Jan. 21, 2011

(65) Prior Publication Data

US 2011/0237394 A1 Sep. 29, 2011

(30) Foreign Application Priority Data

Mar. 29, 2010 (JP) ................................. 2010-075579

(51) Int. Cl.
*F16H 59/74* (2006.01)

(52) U.S. Cl.
USPC .......................................... 477/101; 477/104

(58) Field of Classification Search ........... 477/101–106
See application file for complete search history.

(56) References Cited

U.S. PATENT DOCUMENTS

| | | | |
|---|---|---|---|
| 6,018,198 A * | 1/2000 | Tsuzuki et al. | 290/17 |
| 6,390,947 B1 | 5/2002 | Aoki et al. | |
| 6,799,109 B2 * | 9/2004 | Nakamori et al. | 701/54 |
| 2002/0107103 A1 | 8/2002 | Nakamori et al. | |
| 2003/0045988 A1 | 3/2003 | Suzuki et al. | |
| 2004/0157700 A1 | 8/2004 | Katou | |
| 2012/0309591 A1* | 12/2012 | Katou | 477/110 |

FOREIGN PATENT DOCUMENTS

| | | |
|---|---|---|
| JP | A-2001-099282 | 4/2001 |
| JP | A-2002-206634 | 7/2002 |
| JP | A-2003-014099 | 1/2003 |
| JP | A-2003-074683 | 3/2003 |
| JP | A-2003-240110 | 8/2003 |
| JP | A-2004-239351 | 8/2004 |
| JP | A-2008-213686 | 9/2008 |
| JP | A-2009-287681 | 12/2009 |
| JP | 2011208698 A * | 10/2011 |

OTHER PUBLICATIONS

Apr. 5, 2011 International Search Report issued in PCT/JP2011/052311 (with translation).

* cited by examiner

*Primary Examiner* — Tisha Lewis
(74) *Attorney, Agent, or Firm* — Oliff & Berridge, PLC

(57) ABSTRACT

A power transfer mechanism control device controlling a power transfer mechanism mounted on a vehicle which transfers power from an internal combustion engine to an axle side via a friction engagement element actuated by a fluid pressure from either of a first fluid pressure actuator driven by the power from the internal combustion engine and a second fluid pressure actuator driven by a fluid pressure source different from a fluid pressure source for the first fluid pressure actuator. When the internal combustion engine is to be automatically started, the second fluid pressure actuator is controlled such that, before complete combustion occurs in the internal combustion engine, the friction engagement element stands by in a low-pressure state, and the first fluid pressure actuator is controlled such that the friction engagement element transfers the torque at predetermined timing after the complete combustion occurs in the internal combustion engine.

12 Claims, 13 Drawing Sheets

F I G . 1
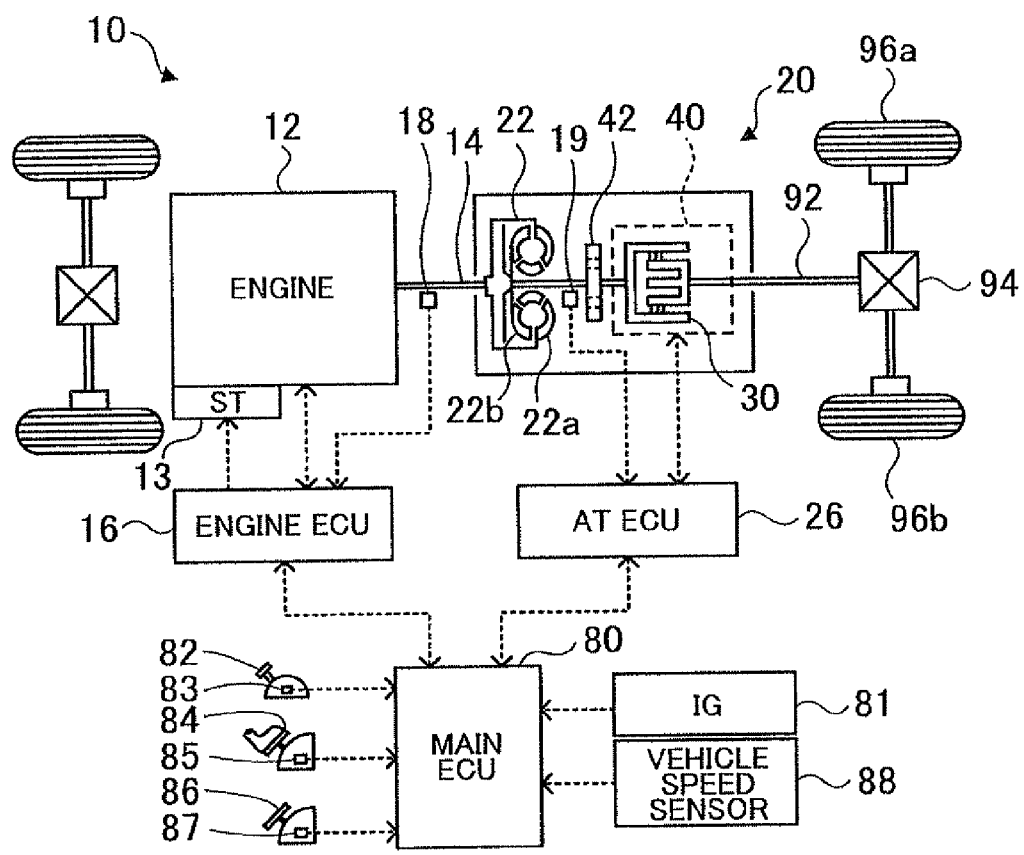

|   |      | C1 | C2 | C3 | B1  | B2  | B3 | B4  | F1 | F2 | F3 |
|---|------|----|----|----|-----|-----|----|-----|----|----|----|
|   | P    |    |    |    |     |     |    |     |    |    |    |
|   | R    |    |    | ○  | (○) |     | ○  | ○   |    |    |    |
|   | N    |    |    |    |     |     |    |     |    |    |    |
| D | 1st  | ○  |    |    |     |     |    | (○) |    |    | ○  |
|   | 2nd  | ○  |    |    |     | (○) | ○  |     | ○  | ○  |    |
|   | 3rd  | ○  |    | ○  | (○) |     | ●  |     | ○  |    |    |
|   | 4th  | ○  | ○  | ●  |     |     | ●  |     |    |    |    |
|   | 5th  |    | ○  | ○  | ○   |     | ●  |     |    |    |    |

(○): ENGINE BRAKE IN OPERATION,
●: ENGAGED WITH NO TORQUE TRANSFERRED

F I G . 12
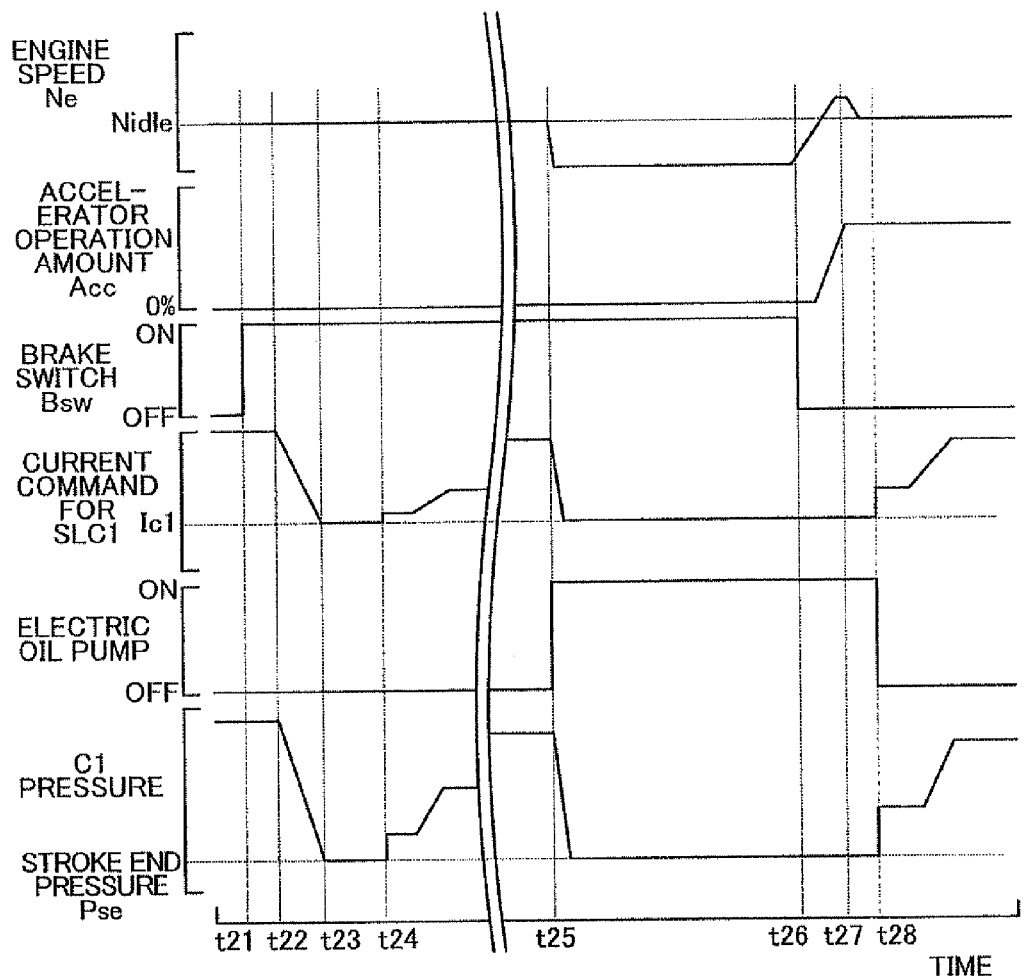

POWER TRANSFER MECHANISM CONTROL DEVICE AND POWER TRANSFER DEVICE

INCORPORATION BY REFERENCE

The disclosure of Japanese Patent Application No. 2010-075579 filed on Mar. 29, 2010 including the specification, drawings and abstract is incorporated herein by reference in its entirety.

BACKGROUND OF THE INVENTION

The present invention relates to a power transfer mechanism control device controlling a power transfer mechanism which is mounted on a vehicle including an automatically stoppable and automatically startable internal combustion engine and which transfers power from the internal combustion engine to an axle side via a friction engagement element actuated by a fluid pressure from either of a first fluid pressure actuator driven by the power from the internal combustion engine and a second fluid pressure actuator driven by a fluid pressure source different from that for the first fluid pressure actuator, and also relates to a power transfer device including a power transfer mechanism and a control device that controls the power transfer mechanism.

DESCRIPTION OF THE RELATED ART

In the related art, as this type of the power transfer device, there has been proposed a power transfer device in which a mechanical oil pump actuated by power of an engine and an electric oil pump actuated by electric power are provided in parallel with each other as hydraulic pressure sources, and which performs control such that a standby pressure which is less than a line pressure generated when the engine is idling and which is equal to or more than an engagement start pressure at which a clutch starts torque transfer is applied to the clutch when the engine is stationary (see Japanese Patent Application Publication No. JP-A-2003-240110, for example).

SUMMARY OF THE INVENTION

The setting of the standby pressure applied to the clutch while the engine is stationary can be considered as an important issue for further improving the starting performance of a vehicle by quickly transferring power of the engine to drive wheels when the engine is started. Meanwhile, when the engine is started, torque variations may be generated, and may cause a shock to the vehicle when the torque variations are transferred to the drive wheels. Therefore, it is desirable to suppress such torque variations as much as possible.

It is a main object of a power transfer mechanism control device and a power transfer device according to the present invention to suppress a shock generated when an automatically stoppable and automatically startable internal combustion engine is automatically started.

In order to achieve the foregoing main object, the power transfer mechanism control device and the power transfer device according to the present invention adopt the following means.

In a power transfer mechanism control device according to a first aspect of the present invention controlling a power transfer mechanism which is mounted on a vehicle including an automatically stoppable and automatically startable internal combustion engine and which transfers power from the internal combustion engine to an axle side via a friction engagement element actuated by a fluid pressure from either of a first fluid pressure actuator driven by the power from the internal combustion engine and a second fluid pressure actuator driven by a fluid pressure source different from a fluid pressure source for the first fluid pressure actuator, in the case where the internal combustion engine which has been automatically stopped is to be automatically started, the second fluid pressure actuator is controlled such that, before complete combustion occurs in the internal combustion engine, the friction engagement element stands by in a low-pressure state in which a fluid pressure is lower than a fluid pressure at which torque is transferred, and the first fluid pressure actuator is controlled such that the friction engagement element transfers the torque at predetermined timing after the complete combustion occurs in the internal combustion engine.

According to the power transfer mechanism control device of the first aspect of the present invention, in the case where the internal combustion engine which has been automatically stopped is to be automatically started, the second fluid pressure actuator is controlled such that, before complete combustion occurs in the internal combustion engine, the friction engagement element stands by in a low-pressure state in which a fluid pressure is lower than a fluid pressure for torque transfer, and the first fluid pressure actuator is controlled such that the friction engagement element transfers torque at the predetermined timing after the complete combustion occurs in the internal combustion engine. Accordingly, transfer of torque variations due to initial combustion that occurs when the internal combustion engine is automatically started to an axle side can be suppressed, which allows the vehicle to start smoothly immediately after the internal combustion engine is started.

In the thus configured power transfer mechanism control device according to a second aspect of the present invention, the first fluid pressure actuator may be controlled so as to start increasing a fluid pressure to be supplied to a fluid pressure servo for the friction engagement element at the predetermined timing when a rotation of the internal combustion engine is stabilized after the internal combustion engine is automatically started. In this case, according to a third aspect of the present invention, the first fluid pressure actuator may be controlled so as to start increasing the fluid pressure to be supplied to the fluid pressure servo for the friction engagement element when, as the predetermined timing, a predetermined period of time has elapsed after the internal combustion engine is automatically started, or according to a fourth aspect of the present invention, the first fluid pressure actuator may be controlled so as to start increasing the fluid pressure to be supplied to the fluid pressure servo for the friction engagement element when, as the predetermined timing, an amount of a temporal change in a rotational speed of the internal combustion engine has converged to a predetermined range after the internal combustion engine is automatically started.

In the power transfer mechanism control device according to a fifth aspect of the present invention, the first fluid pressure actuator may be an actuator including a first pump actuated by the power from the internal combustion engine to generate a fluid pressure, and a pressure regulator that regulates the fluid pressure from the first pump to supply the regulated fluid pressure to the fluid pressure servo for the friction engagement element, and the second fluid pressure actuator may be an actuator including a second pump actuated by supply of electric power to generate a fluid pressure and to supply the generated fluid pressure to the fluid pressure servo for the friction engagement element.

In the power transfer mechanism control device in a sixth aspect of the present invention in which the power transfer mechanism control device includes a switch actuated by the fluid pressure from the first pump to switch between a state in which connection is established between an output port of the pressure regulator and the fluid pressure servo for the friction engagement element and a state in which such connection is blocked, while the internal combustion engine is automatically stopped, the second fluid pressure actuator may be controlled such that the friction engagement element stands by in the low-pressure state and the pressure regulator may be caused to stand by with the same control amount as a control amount for the second fluid pressure actuator, and when the internal combustion engine is automatically started, the pressure regulator may be driven such that the hydraulic pressure to be applied to the fluid pressure servo for the friction engagement element is increased at the predetermined timing after the complete combustion occurs in the internal combustion engine. In this way, abrupt changes in fluid pressure to be applied to the friction engagement element can be suppressed even if the switch establishes connection between the output port of the pressure regulator and the fluid pressure servo for the friction engagement element while the internal combustion engine is automatically started. In the power transfer mechanism control device according to a seventh aspect of the present invention, the second pump may be an electromagnetic pump that reciprocates a piston by repeatedly turning on and off an electromagnetic force to generate a fluid pressure.

In the power transfer mechanism control device according to an eighth aspect of the present invention, the first fluid pressure actuator may be an actuator including a first pump actuated by the power from the internal combustion engine to generate a fluid pressure, and a pressure regulator that regulates the fluid pressure from the first pump to supply the regulated fluid pressure to the fluid pressure servo for the friction engagement element, and the second fluid pressure actuator may be an actuator including a third pump connected in parallel with the first pump and actuated by supply of electric power, and the pressure regulator which is used in common with the first fluid pressure actuator and which regulates a fluid pressure from the third pump to supply the regulated fluid pressure to the fluid pressure servo for the friction engagement element.

In the power transfer mechanism control device according to a ninth aspect of the present invention, alternatively, the first fluid pressure actuator may be an actuator including a first pump actuated by the power from the internal combustion engine to generate a fluid pressure, and a pressure regulator that regulates the fluid pressure from the first pump to supply the regulated fluid pressure to the fluid pressure servo for the friction engagement element, and the second fluid pressure actuator may be an actuator including an electromagnetic valve and a pressure accumulator connected to a flow passage between the pressure regulator and the first pump via the electromagnetic valve.

In the power transfer mechanism control device according to a tenth aspect of the present invention, further, during neutral control performed while the internal combustion engine is in operation, a neutral control amount, which is a control amount by which the friction engagement element is caused to stand by in a neutral state with pressure lower than a complete engagement pressure, may be set on the basis of a power transfer state of the power transfer mechanism to control the first fluid pressure actuator, and learned, and while the internal combustion engine is automatically stopped, the second fluid pressure actuator may be controlled using the learned neutral control amount such that the friction engagement element stands by in the low-pressure state. Because the neutral control amount for causing the friction engagement element to stand by in the neutral state is learned during the neutral control, and the friction engagement element is caused to stand by in the low-pressure state using the learned neutral control amount while the motor is automatically stopped, the friction engagement element can be brought to a state allowing the friction engagement element to be quickly engaged in its next engagement while the motor is automatically stopped, which allows smooth transfer of power from the motor after the motor is automatically started. In addition, the friction engagement element can be brought to a more appropriate state irrespective of secular changes. The "neutral state" includes not only a state in which a fluid pressure less than the stroke end pressure is applied to the friction engagement element so that the input side and the output side of the friction engagement element are disengaged from each other, but also a state in which a fluid pressure equal to or more than the stroke end pressure is applied to the friction engagement element so that slight power is transferred with some sliding between the input side and the output side of the friction engagement element. In the power transfer mechanism control device according to an eleventh aspect of the present invention, in the case where the internal combustion engine which has been automatically stopped is to be automatically started, the first fluid pressure actuator may be controlled such that a standby pressure established by the second fluid pressure actuator is held until the predetermined timing after the complete combustion occurs in the internal combustion engine.

A power transfer device according to a twelfth aspect of the present invention includes: a power transfer mechanism which is mounted on a vehicle including an automatically stoppable and automatically startable internal combustion engine and which transfers power from the internal combustion engine to an axle side via a friction engagement element actuated by a fluid pressure from either of a first fluid pressure actuator driven by the power from the internal combustion engine and a second fluid pressure actuator driven by a fluid pressure source different from a fluid pressure source for the first fluid pressure actuator; and the power transfer mechanism control device according to any one of the aspects of the present invention discussed above which controls the power transfer mechanism.

Because the power transfer device according to the present invention includes the power transfer mechanism control device according to any one of the aspects of the present invention discussed above, the power transfer device according to the present invention can achieve the effect achieved by the power transfer mechanism control device according to the present invention. For example, the power transfer device according to the present invention can suppress transfer of torque variations due to initial combustion that occurs when the internal combustion engine is automatically started to an axle side, can appropriately manage the engagement state of the friction engagement element when the internal combustion engine is automatically stopped, can bring the friction engagement element to a more appropriate engagement state irrespective of secular changes, and so forth.

BRIEF DESCRIPTION OF THE DRAWINGS

FIG. 1 is a diagram showing a schematic configuration of an automobile 10 incorporating a power transfer device 20 according to an embodiment of the present invention;

FIG. 12 shows temporal changes in engine speed Ne, accelerator operation amount Acc, brake switch signal BSW, current command for the linear solenoid SLC1, drive command for an electric oil pump, and hydraulic pressure of the clutch C1 (C1 pressure) according to the modification;

DETAILED DESCRIPTION OF THE EMBODIMENT

An embodiment of the present invention will be described below.

Figures 2, 3:
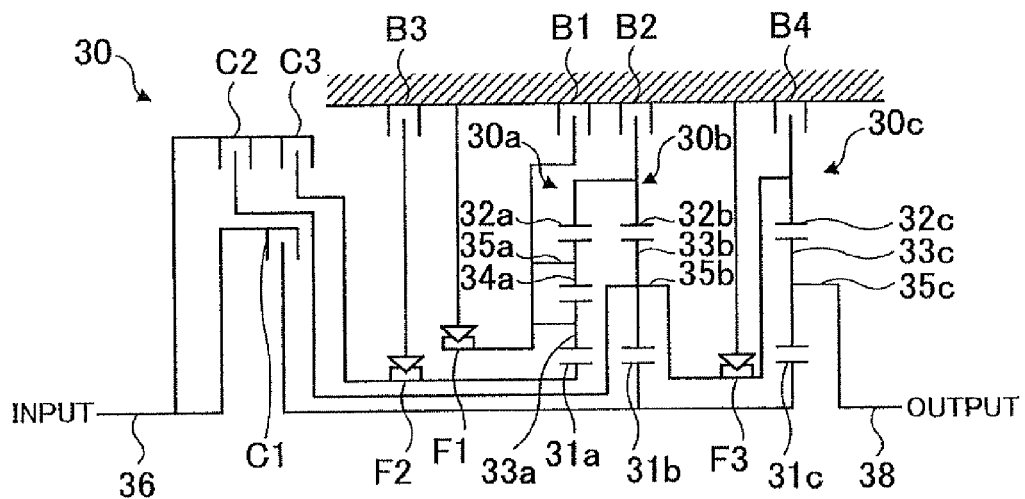
FIG. 2 is a diagram showing a schematic configuration of an automatic transmission 30 provided in the power transfer device 20 according to the embodiment.
FIG. 3 shows an operation table of the automatic transmission 30.

FIG. 1 is a diagram showing a schematic configuration of an automobile 10 incorporating a power transfer device 20 according to the embodiment of the present invention. FIG. 2 is a diagram showing a schematic configuration of an automatic transmission 30 provided in the power transfer device 20 according to the embodiment. FIG. 3 shows an operation table of the automatic transmission 30.

As shown in FIG. 1, the automobile 10 according to the embodiment includes an engine 12 which is an internal combustion engine that outputs power generated by explosive combustion of a hydrocarbon fuel such as gasoline and diesel oil, and the power transfer device 20 according to the embodiment which is connected to a crankshaft 14 of the engine 12 and connected to a drive shaft 92 coupled to left and right wheels 96a and 96b via a differential gear 94 to transfer the power from the engine 12 to the drive shaft 92.

Operation of the engine 12 is controlled by an engine electronic control unit (hereinafter referred to as an engine ECU) 18. Although not shown in detail in the drawings, the engine ECU 18 is formed as a microprocessor including a CPU as its main component, and includes a ROM that stores a processing program, a RAM that temporarily stores data, input and output ports, and a communication port in addition to the CPU. Signals from various sensors that are necessary to control operation of the engine 12, such as a rotational speed sensor 16 attached to the crankshaft 14, are input to the engine ECU 18 via the input port. A drive signal for a throttle motor that adjusts the throttle opening, a control signal for a fuel injection valve, an ignition signal for an ignition plug, a drive signal for a starter motor 13 that cranks the engine 12, and so forth are output from the engine ECU 18 via the output port. The engine ECU 18 communicates with a main electronic control unit (hereinafter referred to as a main ECU) 80 that controls the entire vehicle, and controls the engine 12 in accordance with a control signal from the main ECU 80 and outputs data on the operating state of the engine 12 to the main ECU 80 as necessary.

The power transfer device 20 according to the embodiment is formed as a transaxle device that transfers the power from the engine 12 to the drive shaft 92, and includes a torque converter 22, a mechanical oil pump 42, the automatic transmission 30, a hydraulic circuit 40, and an automatic transmission electronic control unit (hereinafter referred to as an AT ECU) 26. The torque converter 22 is provided with a lock-up clutch including a pump impeller 22a on the input side connected to the crankshaft 14 of the engine 12 and a turbine runner 22b on the output side. The mechanical oil pump 42 is disposed at a stage subsequent to the torque converter 22 to pump hydraulic oil using the power from the engine 12. The automatic transmission 30 is a hydraulically driven stepped automatic transmission including an input shaft 36 connected to the turbine runner 22b side of the torque converter 22 and an output shaft 38 connected to the drive shaft 92, and changes speed of the power input to the input shaft 36 and outputs the power at the changed speed to the output shaft 38. The hydraulic circuit 40 serves as an actuator that drives the automatic transmission 30. The AT ECU 26 controls the automatic transmission 30 (hydraulic circuit 40).

As shown in FIG. 2, the automatic transmission 30 includes a double-pinion type planetary gear mechanism 30a, two single-pinion type planetary gear mechanisms 30b and 30c, three clutches C1, C2, and C3, four brakes B1, B2, B3, and B4, and three one-way clutches F1, F2, and F3. The double-pinion type planetary gear mechanism 30a includes a sun gear 31a which is an external gear, a ring gear 32a which is an internal gear disposed concentrically with the sun gear 31a, a plurality of first pinion gears 33a meshed with the sun gear 31a, a plurality of second pinion gears 34a meshed with the first pinion gears 33a and meshed with the ring gear 32a, and a carrier 35a that couples the plurality of first pinion gears 33a and the plurality of second pinion gears 34a to each other and that holds the gears 33a and the gears 34a rotatably and revolvably. The sun gear 31a is connected to the input shaft 36 via the clutch C3, and either allowed to rotate freely or allowed to rotate only in one direction by engaging and disengaging the brake I33 connected to the sun gear 31a via the one-way clutch F2. The ring gear 32a is either allowed to rotate freely or held stationary by engaging and disengaging the brake 132. The carrier 35a is allowed to rotate only in one direction by the one-way clutch F1, and either allowed to rotate freely or held stationary by engaging and disengaging the brake B1. The single-pinion type planetary gear mechanism 30b includes a sun gear 31b which is an external gear, a ring gear 32b which is an internal gear disposed concentrically with the sun gear 31b, a plurality of pinion gears 33b meshed with the sun gear 31b and meshed with the ring gear 32b, and a carrier 35b that holds the plurality of pinion gears 33b rotatably and revolvably. The sun gear 31b is connected to the input shaft 36 via the clutch C1 The ring gear 32b is connected to the ring gear 32a of the double-pinion type planetary gear mechanism 30a, and either allowed to rotate freely or held stationary by engaging and disengaging the brake B2. The carrier 35b is connected to the input shaft 36 via the clutch C2, and allowed to rotate only in one direction by the one-way clutch F3. The single-pinion type planetary gear mechanism 30c includes a sun gear 31c which is an externally toothed gear, a ring gear 32c which is an internally toothed gear disposed concentrically with the sun gear 31e, a plurality of pinion gears 33c meshed with the sun gear 31c and meshed with the ring gear 32c, and a carrier 35c that holds the plurality of pinion gears 33c rotatably and revolvably. The sun gear 31c is connected to the sun gear 31b of the single-pinion type planetary gear mechanism 30b. The ring gear 32c is connected to the carrier 35b of the single-pinion type planetary gear mechanism 30b, and either allowed to rotate freely or held stationary by engaging and disengaging the brake B4. The carrier 35c is connected to the output shaft 38.

As shown in FIG. 3, the automatic transmission 30 can switchably establish first to fifth forward speeds, a reverse speed, and a neutral by engaging and disengaging the clutches C1 to C3 and engaging and disengaging the brakes B1 to B4.

The first forward speed state, that is, a state at which rotation of the input shaft 36 is reduced in speed at the highest speed reduction ratio and transferred to the output shaft 38, can be established by engaging the clutch C1 and disengaging the clutches C2 and C3 and the brakes B1 to B4. When the engine brake is in operation with the first forward speed state established, the brake B4 is engaged to hold rotation of the ring gear 32c stationary in place of the one-way clutch F3. The second forward speed state can be established by engaging the clutch C1 and the brake B3 and disengaging the clutches C2 and C3 and the brakes B1, B2, and B4. When the engine brake is in operation with the second forward speed state established, the brake 82 is engaged to hold rotation of the ring gear 32a stationary and the ring gear 32b in place of the one-way clutch F1 and the one-way clutch F2. The third forward speed state can be established by engaging the clutches C1 and C3 and the brake B3 and disengaging the clutch C2 and the brakes B1, B2, and 134. The fourth forward speed state can be established by engaging the clutches C1 to C3 and the brake B3 and disengaging the brakes 131, B2, and B4. The fifth forward speed state, that is, a state in which rotation of the input shaft 36 is reduced in speed at the lowest speed reduction ratio (or increased in speed) and transferred to the output shaft 38, can be established by engaging the clutches C2 and C3 and the brakes B1 and B3 and disengaging the clutch C1 and the brakes 132 and B4. In the automatic transmission 30, the neutral state, that is, a state in which the input shaft 36 and the output shaft 38 are disengaged from each other, can be established by disengaging all of the clutches C1 to C3 and the brakes B1 to 134. The reverse state can be established by engaging the clutch C3 and the brake B4 and disengaging the clutches C1 and C2 and the brakes B1 to B3.

Figure 4:
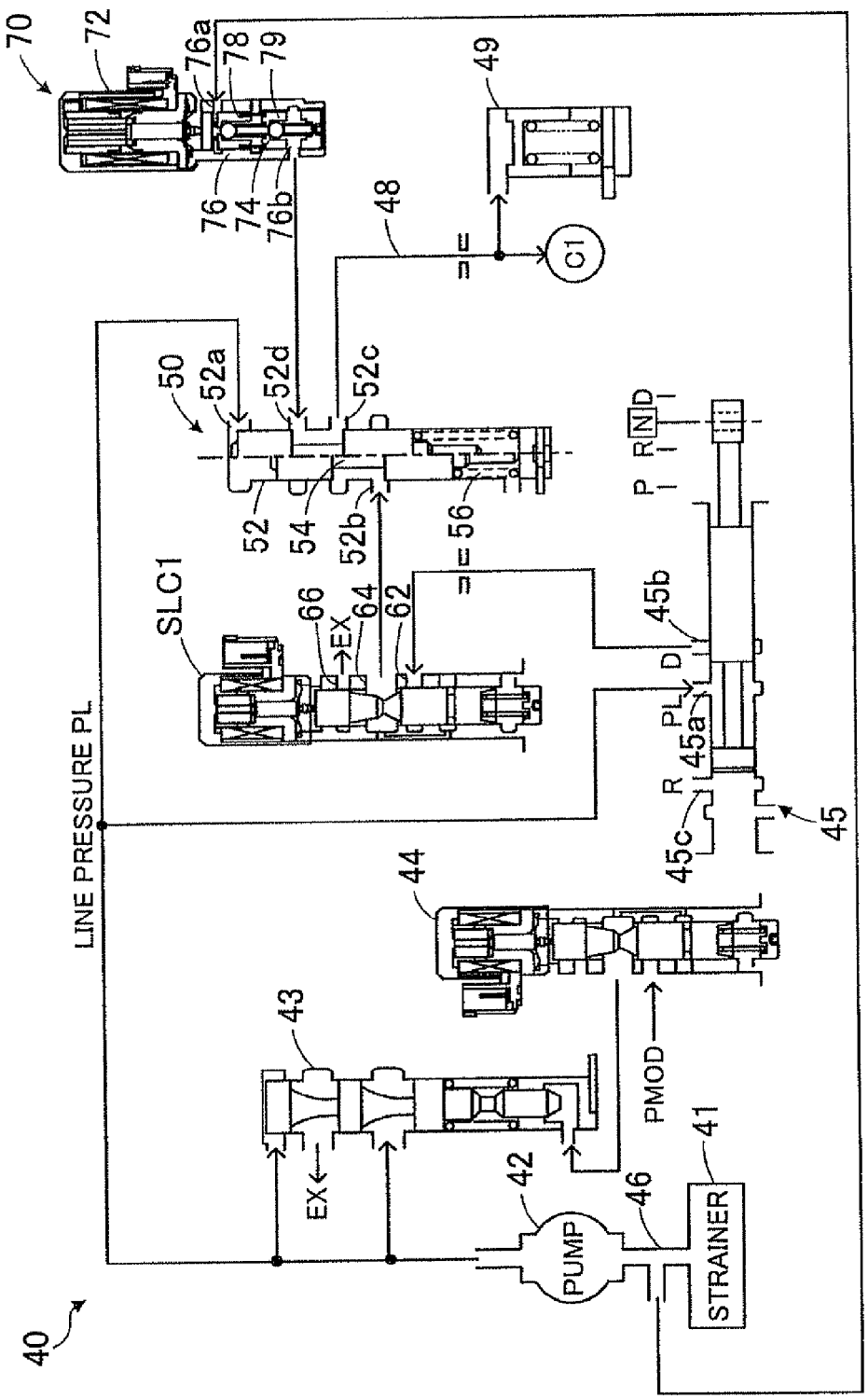
FIG. 4 is a partial configuration diagram showing a schematic configuration of a hydraulic circuit 40.

The clutches C1 to C3 and the brakes B1 to B4 in the automatic transmission 30 are engaged and disengaged by the hydraulic circuit 40. FIG. 4 is a partial configuration diagram showing a schematic configuration of a drive system for the clutch C1 in the hydraulic circuit 40. As shown in FIG. 4, the hydraulic circuit 40 is formed by: the mechanical oil pump 42 which sucks hydraulic oil from a strainer 41 and pumps the hydraulic oil using the power from the engine 12; a regulator valve 43 that adjusts the pressure (line pressure PL) of the hydraulic oil pumped from the mechanical oil pump 42; a linear solenoid 44 that drives the regulator valve 43 by regulating a modulator pressure PMOD generated from the line pressure PL via a modulator valve (not shown) to output the modulator pressure PMOD as a signal pressure; a manual valve 45 formed with an input port 45a to which the line pressure PL is input, a D (drive)-position output port 45b, an R (reverse)-position output port 45c, and so forth to establish and block communication between the respective ports in conjunction with an operation of a shift lever 82; a linear solenoid SLC1 that receives hydraulic oil from the D-position output port 45b of the manual valve 45 via an input port 62 and regulates the received hydraulic oil to output the regulated hydraulic oil from an output port 64; an electromagnetic pump 70 that suctions hydraulic oil from an suction port 76a via a suction check valve 78 by reciprocating a piston 74 in a cylinder 76 by turning on and off an electromagnetic force of an electromagnetic section 72 and discharges the suctioned hydraulic oil from a discharge port 76b via a discharge check valve 79; a switching valve 50 that selectively receives the hydraulic oil from the linear solenoid SLC1 and the hydraulic oil from the electromagnetic pump 70 and outputs the received hydraulic oil to a hydraulic servo for the clutch C1; an accumulator 49 attached to an oil passage 48 connected to the hydraulic servo for the clutch C1, and so forth. The suction port 76a of the electromagnetic pump 70 is connected to an oil passage 46 extending between the strainer 41 and the mechanical oil pump 42 so that the electromagnetic pump 70 suctions hydraulic oil from the oil passage 46 and discharges the hydraulic oil from the discharge port 76b. Hydraulic systems for the clutches other than the clutch C1, namely C2 and C3, and the brakes B1 to B4 do not constitute the core of the present invention, and thus are not shown in FIG. 4. Such hydraulic systems may be formed using a known linear solenoid and so forth.

As shown in FIG. 4, the switching valve 50 is formed by: a sleeve 52 formed with various ports including a signal pressure input port 52a to which the line pressure PL is input as a signal pressure, an input port 52b connected to the output port 64 of the linear solenoid SLC1, an input port 52c connected to the discharge port 76b of the electromagnetic pump 70, and an output port 52d connected to the oil passage 48 for the clutch C1; a spool 54 that slides in the sleeve 52 in the axial direction; and a spring 56 that urges the spool 54 in the axial direction. In the switching valve 50, when the line pressure PL is applied to the signal pressure input port 52a, the line pressure PL exceeds the urging force of the spring 56 to push in the spool 54, which establishes communication between the input port 52b and the output port 52d and blocks communication between the input port 52c and the output port 52d. When the line pressure PL is not applied to the signal pressure input port 52a, on the other hand, the urging force of the spring 56 pushes out the spool 54, which blocks communication between the input port 52b and the output port 52d and establishes communication between the input port 52c and the output port 52d.

Although not shown in detail in the drawings, the AT ECU 26 is formed as a microprocessor including a CPU as its main component, and includes a ROM that stores a processing program, a RAM that temporarily stores data, input and output ports, and a communication port in addition to the CPU. A turbine speed Nt from a rotational speed sensor 24 attached to the input shaft 36, an output shaft speed Nout from a rotational speed sensor attached to the output shaft 38, and so forth are input to the AT ECU 26 via the input port, Drive signals for various solenoids such as the linear solenoid 44 and the linear solenoid SLC1, a drive signal for the electromagnetic pump 70, and so forth are output from the AT ECU 26 via the output port. The AT ECU 26 communicates with the main ECU 80, and controls the automatic transmission 30 (hydraulic circuit 40) in accordance with a control signal from the main ECU 80 and outputs data on the state of the automatic transmission 30 to the main ECU 80 as necessary.

Although not shown in detail in the drawings, the main ECU 80 is formed as a microprocessor including a CPU as its main component, and includes a ROM that stores a processing program, a RAM that temporarily stores data, input and output ports, and a communication port in addition to the CPU. An ignition signal from an ignition switch 81, a shift position SP from a shift position sensor 83 that detects the operation position of the shift lever 82, an accelerator operation amount Acc from an accelerator pedal position sensor 85 that detects the depression amount of an accelerator pedal 84, a brake switch signal BSW from a brake switch 87 that detects depression of a brake pedal 86, a vehicle speed V from a vehicle speed sensor 88, and so forth are input to the main ECU 80 via the input port. The main ECU 80 is connected to the engine ECU 18 and the AT ECU 26 via the communication port to exchange various control signals and data with the engine ECU 18 and the AT ECU 26.

In the thus configured automobile 10, if neutral control start conditions set in advance, such as the value of the vehicle speed V being zero, the accelerator turned off, the brake switch signal BSW turned on, and the engine 12 in operation, are all satisfied when the shift lever 82 is in the D (drive) position, neutral control (in-neutral control) in which the clutch C1 for the first forward speed is held at a fluid pressure around the stroke end pressure is executed until any of the above conditions is not satisfied.

If automatic stop conditions set in advance, such as the value of the vehicle speed V being zero, the accelerator turned off, the brake switch signal BSW turned on, and the engine 12 kept idling over a predetermined period of time, are all satisfied when the shift lever 82 is in the D (drive) position, the engine 12 is automatically stopped. After the engine 12 is automatically stopped, if automatic start conditions set in advance, such as the brake switch signal BSW turned off, are satisfied, the engine 12 which has been automatically stopped is automatically started.

Figure 5:
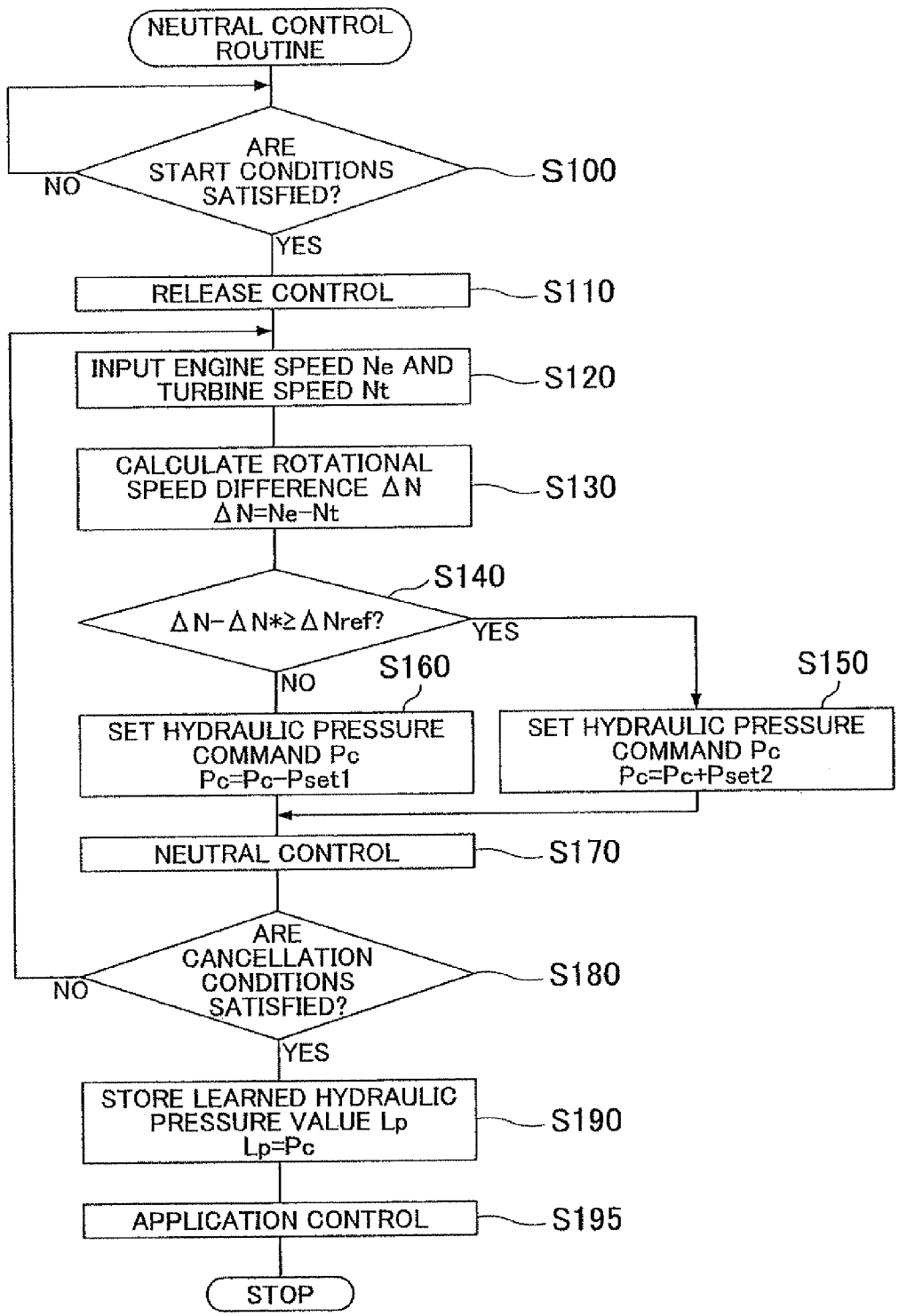
FIG. 5 is a flowchart showing an exemplary neutral control routine.

Next, operation of the power transfer device 20 according to the embodiment mounted on the thus configured automobile 10, specifically operation of the power transfer device 20 performed during neutral control and when the engine 12 is automatically stopped, will be described. Operation of the power transfer device 20 performed during neutral control will be described first, and operation of the power transfer device 20 performed when the engine 12 is automatically stopped will be described thereafter. FIG. 5 is a flowchart showing an exemplary neutral control routine executed by the AT ECU 26.

When the neutral control routine is executed, the CPU of the AT ECU 26 first waits for the neutral control start conditions discussed earlier to be satisfied (step S100). When the neutral control start conditions are satisfied, release control in which the engagement pressure of the clutch C1 is gradually reduced is executed (step S110). Subsequently, the engine speed Ne and the turbine speed Nt are input (step S120). A rotational speed difference $\Delta N$ (Ne−Nt) is calculated on the basis of a deviation between the engine speed Ne and the turbine speed Nt which have been input (step S130). A deviation ($\Delta N - \Delta N^*$) between the calculated rotational speed difference $\Delta N$ and a target rotational speed difference $\Delta N^*$ is compared with a threshold $\Delta$Nref (step S140). If the deviation ($\Delta N - \Delta N^*$) is smaller than the threshold $\Delta$Nref, a new hydraulic pressure command Pc (current command) obtained by increasing the preceding hydraulic pressure command by a predetermined pressure Pset1 is set (step S150). If the deviation ($\Delta N - \Delta N^*$) is equal to or more than the threshold $\Delta$Nref, a new hydraulic pressure command Pc obtained by reducing the preceding hydraulic pressure command by a predetermined pressure Pset2 is set (step S160). Neutral control in which the linear solenoid SLC1 is driven on the basis of the newly set hydraulic pressure command Pc is executed (step S170). The target rotational speed difference $\Delta N^*$ is determined in advance as a difference between the engine speed and the turbine speed in a state in which a hydraulic pressure around the stroke end pressure is applied to the clutch C1. Thus, the clutch C1 can be caused to stand by at a fluid pressure around the stroke end pressure by increasing and reducing the hydraulic pressure command Pc such that the deviation ($\Delta N - \Delta N^*$) is in the range of the threshold $\Delta$Nref. Then, the process returns to step S120 to repeatedly execute neutral control in steps S120 to S170 until the neutral control cancellation conditions discussed earlier are satisfied (step S180). If the neutral control cancellation conditions are satisfied, the last hydraulic pressure command Pc (current command) set in either of steps S150 and S160 is stored in the RAM as a learned hydraulic pressure value Lp (step S190). Application control in which the hydraulic pressure to be supplied to the hydraulic servo for the clutch C1 is increased to engage the clutch C1 is executed (step S195). The routine is then terminated. The reason to store the learned hydraulic pressure value Lp will be discussed later. The neutral control routine has thus been described above.

Figure 6:
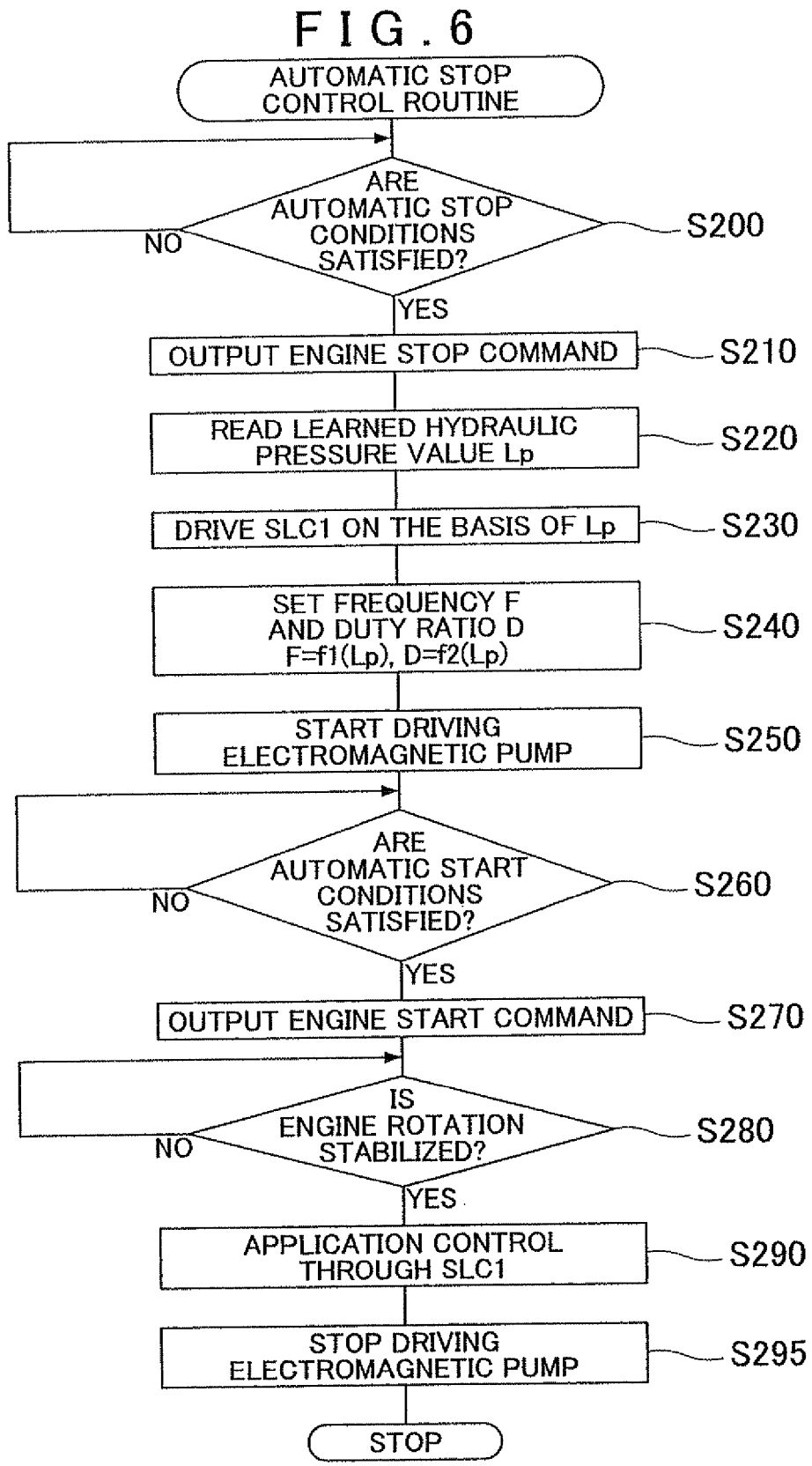
FIG. 6 is a flowchart showing an exemplary automatic stop control routine.
Figure 7:
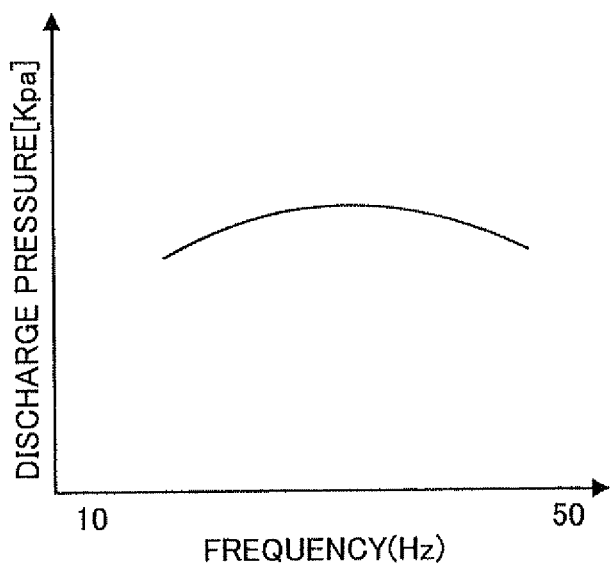
FIG. 7 shows an exemplary frequency setting map.
Figure 8:
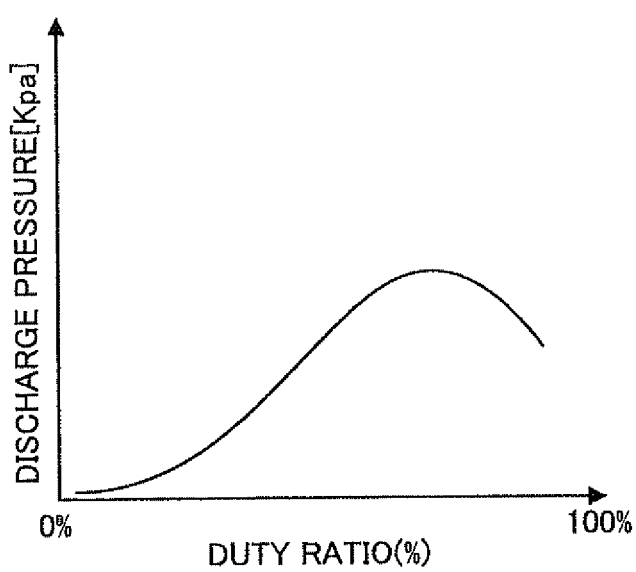
FIG. 8 shows an exemplary duty ratio setting map.

Next, control performed when the engine 12 is automatically stopped will be described. FIG. 6 is a flowchart showing an exemplary automatic stop control routine executed by the AT ECU 26. When the automatic stop control routine is executed, the CPU of the AT ECU 26 first waits for the automatic stop conditions discussed earlier to be satisfied (step S200). An engine stop command for stopping operation of the engine 12 is output to the engine ECU 16 via the main ECU 80 (step S210). Subsequently, the stored learned hydraulic pressure value Lp (current command) is read (step S220). The linear solenoid SLC1 is driven to stand by at the read learned hydraulic pressure value Lp (step S230). A frequency F and a duty ratio D are set on the basis of the read learned hydraulic pressure value Lp (step S240). The electromagnetic pump 70 starts being driven on the basis of the frequency F and the duty ratio D which have been set (step S250). In the embodiment, the frequency F for the electromagnetic pump 70 is set by obtaining the relationship between the discharge pressure and the frequency F in advance to store the obtained relationship in the ROM as a frequency setting map, and converting the given learned hydraulic pressure value Lp into a discharge pressure to derive a corresponding frequency F on the basis of the discharge pressure obtained through the conversion using the map. FIG. 7 shows an exemplary frequency setting map. In the embodiment, the duty ratio D is set by obtaining the relationship between the discharge pressure and the duty ratio D in advance to store the obtained relationship in the ROM as a duty ratio setting map, and converting the given learned hydraulic pressure value Lp into a discharge pressure to derive a corresponding duty ratio D on the basis of the discharge pressure obtained through the conversion using the map. FIG. 8 shows an exemplary duty ratio setting map. Then, the process waits for the automatic start conditions discussed earlier to be satisfied (step S260). An engine start command for starting the engine 12 is output to the engine ECU 16 via the main ECU 80 (step S270). The process waits for complete combustion to occur in the engine 12 and for rotation of the engine 12 to be stabilized (step S280). Application control in which the linear solenoid SLC1 is driven such that the hydraulic pressure to be applied to the hydraulic servo for the clutch C1 is gradually increased to completely engage the clutch C1 is executed (step S290). The electromagnetic pump 70 stops being driven (step S295). The routine is thus terminated. By driving the electromagnetic pump 70 to cause the clutch C1 to stand by at a hydraulic pressure around the stroke end pressure while the engine 12 is automatically stopped as described above, the clutch C1 can be quickly engaged immediately after the engine 12 is automatically started, which allows the vehicle to start smoothly. At this time, because the engine 12 has been automatically stopped, the clutch C1 cannot be caused to stand by at a hydraulic pressure around the stroke end pressure using the same method as used during neutral control. However, by controlling the electromagnetic pump 70 with the hydraulic pressure command Pc (learned hydraulic pressure value Lp) used during the neutral control, the clutch C1 can be caused to stand by at a hydraulic pressure around the stroke end pressure with more accuracy using the discharge pressure from the electromagnetic pump 70.

The determination performed in step S280 as to whether rotation of the engine 12 has been stabilized can be performed by empirically obtaining in advance the period of time required for rotation of the engine 12 to be stabilized since the engine 12 is automatically started and determining whether or not the obtained period of time has elapsed, or by differentiating the engine speed Ne to obtain the speed change rate and determining whether or not the speed change rate has converged to a predetermined range around a value of 0. Application control for the linear solenoid SLC1 is started after rotation of the engine 12 is stabilized in order to suppress transfer of torque variations due to initial combustion of the engine 12 to the drive shaft 92 (wheels 96a and 96b).

Figure 9:
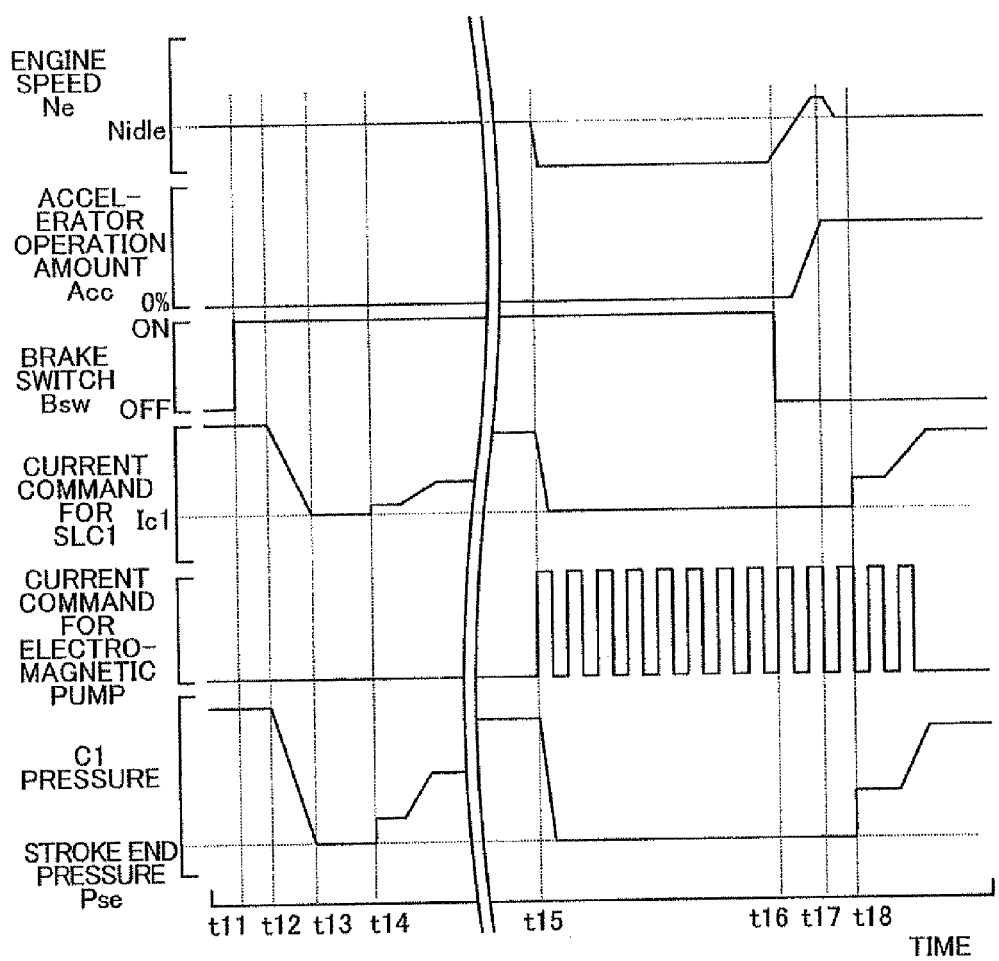
FIG. 9 shows temporal changes in engine speed Ne, accelerator operation amount Acc, brake switch signal BSW, current command for a linear solenoid SLC1, current command for an electromagnetic pump, and hydraulic pressure of a clutch C1 (C1 pressure) according to the embodiment.

FIG. 9 shows temporal changes in engine speed Ne, accelerator operation amount Acc, brake switch signal BSW, current command for the linear solenoid SLC1, current command for the electromagnetic pump 70, and hydraulic pressure of the clutch C1 (C1 pressure) according to the embodiment. As shown in the drawing, when the neutral control start conditions are satisfied at time t11, release control is executed at time t12. At time t13 at which the release control is completed, a hydraulic pressure command Pc (current command) is set through feedback control on the basis of the rotational speed difference ΔN between the engine speed Ne and the turbine speed Nt, and the linear solenoid SLC1 is driven on the basis of the set hydraulic pressure command Pc to cause the clutch C1 to stand by at a hydraulic pressure around the stroke end pressure (neutral control). Then, when the neutral control cancellation conditions are satisfied at time t14, application control in which the hydraulic pressure to be applied to the clutch C1 is gradually increased is executed. At this time, the last hydraulic pressure command Pc set during the neutral control is stored as the learned hydraulic pressure value Lp. When the automatic stop conditions for the engine 12 are satisfied at time t15, the electromagnetic pump 70 starts being driven. At this time, because the electromagnetic pump 70 is driven in accordance with the frequency F and the duty ratio D at which a discharge pressure obtained by converting the stored learned hydraulic pressure value Lp is obtained, the clutch C1 can be caused to stand by at a hydraulic pressure around the stroke end pressure. The linear solenoid SLC1 is driven on the basis of the learned hydraulic pressure value Lp (current command). Then, when the automatic start conditions for the engine 12 are satisfied at time t16, the starter motor 13 is driven to start cranking the engine 12. When the line pressure PL is generated along with rotation of the engine 12, the switching valve 50 is switched from a state in which connection is established between the discharge port 76b of the electromagnetic pump 70 and the oil passage 48 for the clutch C1 to a state in which connection is established between the output port 64 of the linear solenoid SLC1 and the oil passage 48 for the clutch C1 so that the hydraulic pressure output from the linear solenoid SLC1 is applied to the clutch C1. Because the linear solenoid SLC1 is driven on the basis of the learned hydraulic pressure value Lp, however, the hydraulic pressure to be applied to the clutch C1 does not change abruptly. When complete combustion occurs in the engine 12 (time t17) and rotation of the engine 12 is stabilized (time t18), application control in which the hydraulic pressure to be applied to the clutch C1 is gradually increased is executed to completely engage the clutch C1. Because application control is performed after rotation of the engine 12 is stabilized, torque variations due to initial combustion of the engine 12 are not transferred to the drive shaft 92 (wheels 96a and 96b).

According to the power transfer device 20 of the embodiment described above, while the engine 12 is automatically stopped, the clutch C1 is caused to stand by at a hydraulic pressure around the stroke end pressure using the discharge pressure from the electromagnetic pump 70. When the engine 12 is automatically started next time, application control in which the hydraulic pressure to be applied to the clutch C1 is gradually increased using the pressure output from the linear solenoid SLC1 is started after complete combustion occurs in the engine 12 and rotation of the engine 12 is stabilized. Thus, transfer of torque variations due to initial combustion of the engine 12 to the drive shaft 92 (wheels 96a and 96b) can be suppressed, which can suppress generation of a torque shock. Moreover, while the engine 12 is automatically stopped, the linear solenoid SLC1 is caused to stand by in a state in which the linear solenoid SLC1 can output a hydraulic pressure equivalent to the discharge pressure from the electromagnetic pump 70. Thus, even if the switching valve 50 is switched from a state in which connection is established between the discharge port 76b of the electromagnetic pump 70 and the oil passage 48 for the clutch C1 to a state in which connection is established between the output port 64 of the linear solenoid SLC1 and the oil passage 48 for the clutch C1 while the engine 12 is automatically started, abrupt changes in hydraulic pressure to be applied to the clutch C1 can be suppressed.

According to the power transfer device 20 of the embodiment, a hydraulic pressure command set through feedback control on the basis of the rotational speed difference ΔN between the engine speed Ne and the turbine speed Nt such that the clutch C1 stands by at a hydraulic pressure around the stroke end pressure during neutral control is stored as a learned hydraulic pressure value Lp, and the electromagnetic pump 70 is driven using the stored hydraulic pressure command (learned hydraulic pressure value Lp) when the engine 12 is automatically stopped, and the linear solenoid SLC1 is driven such that the hydraulic pressure to be applied to the clutch C1 is gradually increased to completely engage the clutch C1 when the engine 12 is automatically started. Thus, the clutch C1 can be more reliably caused to stand by at a hydraulic pressure around the stroke end pressure when the engine 12 is automatically stopped, which allows the clutch C1 to be quickly engaged immediately after the engine 12 is automatically started. As a result, the vehicle can start smoothly. Moreover, because a hydraulic pressure command set through feedback control during neutral control is used, the clutch C1 can be more reliably caused to stand by at a hydraulic pressure around the stroke end pressure irrespective of secular changes.

While the discharge port 76b of the electromagnetic pump 70 is connected to the oil passage 48 for the clutch C1 via the switching valve 50 in the power transfer device 20 according to the embodiment, the discharge port 76b of the electromagnetic pump 70 may be directly connected to the oil passage 48 for the clutch C1.

While the switching valve 50 is driven using the line pressure PL in the power transfer device 20 according to the embodiment, the switching valve 50 may be driven using the modulator pressure PMOD obtained by reducing the line pressure PL via a modulator valve (not shown), or may be driven using a solenoid valve via which the line pressure PL or the modulator pressure PMOD is supplied to the switching valve 50.

Figure 10:
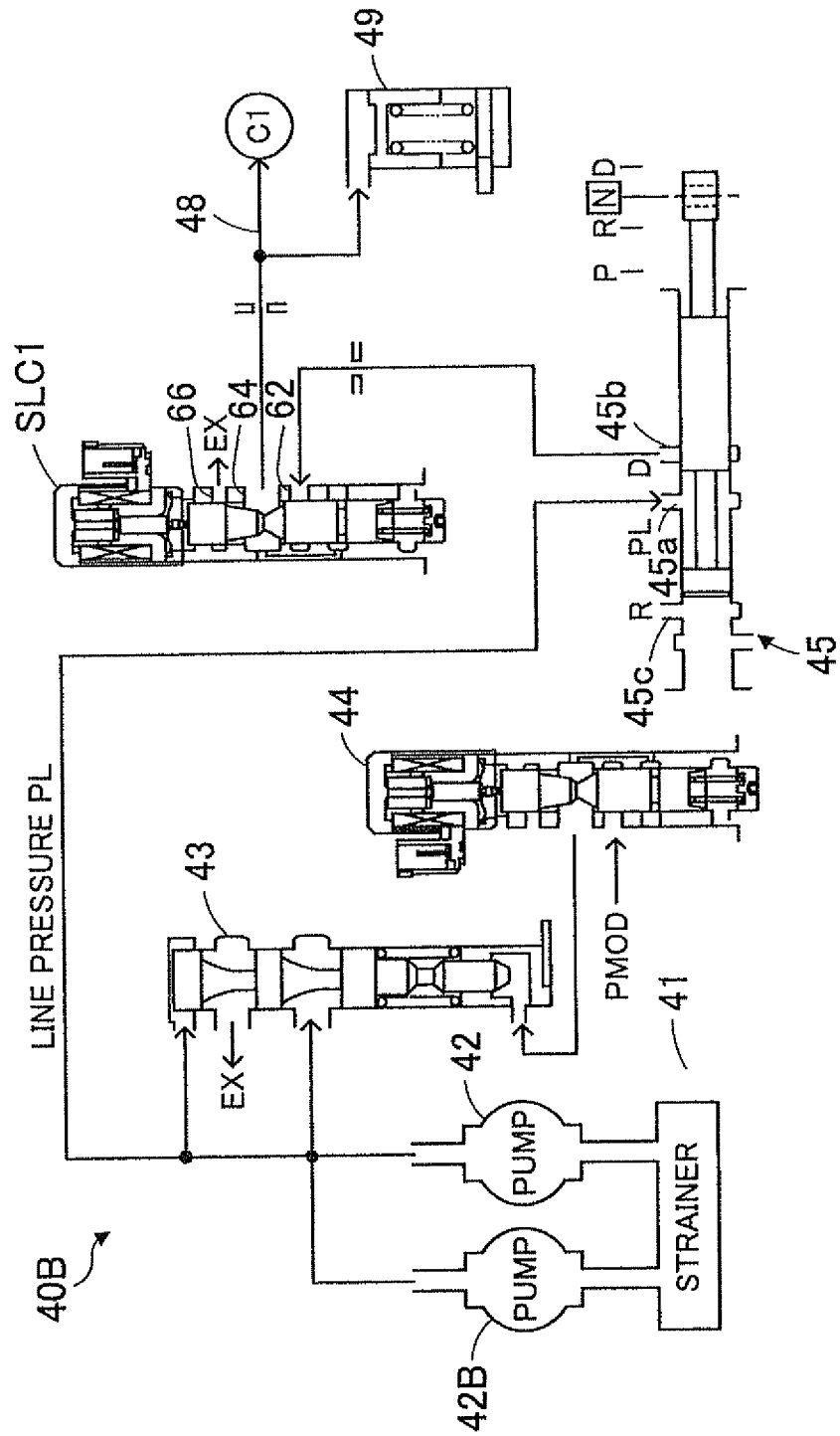
FIG. 10 shows a schematic configuration of a hydraulic circuit 40B according to a modification.
Figure 11:
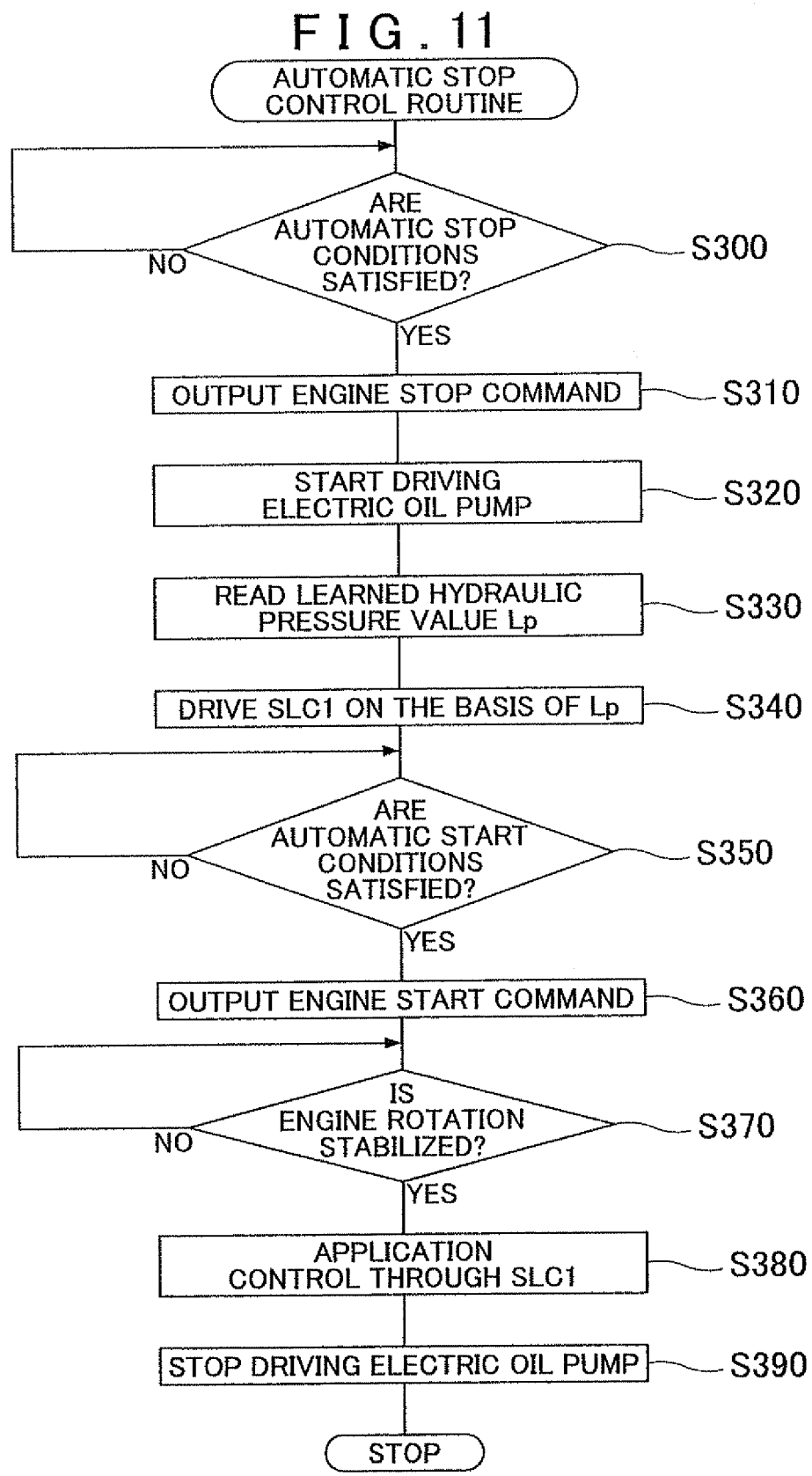
FIG. 11 is a flowchart showing an automatic stop control routine according to the modification.
Figure 13:
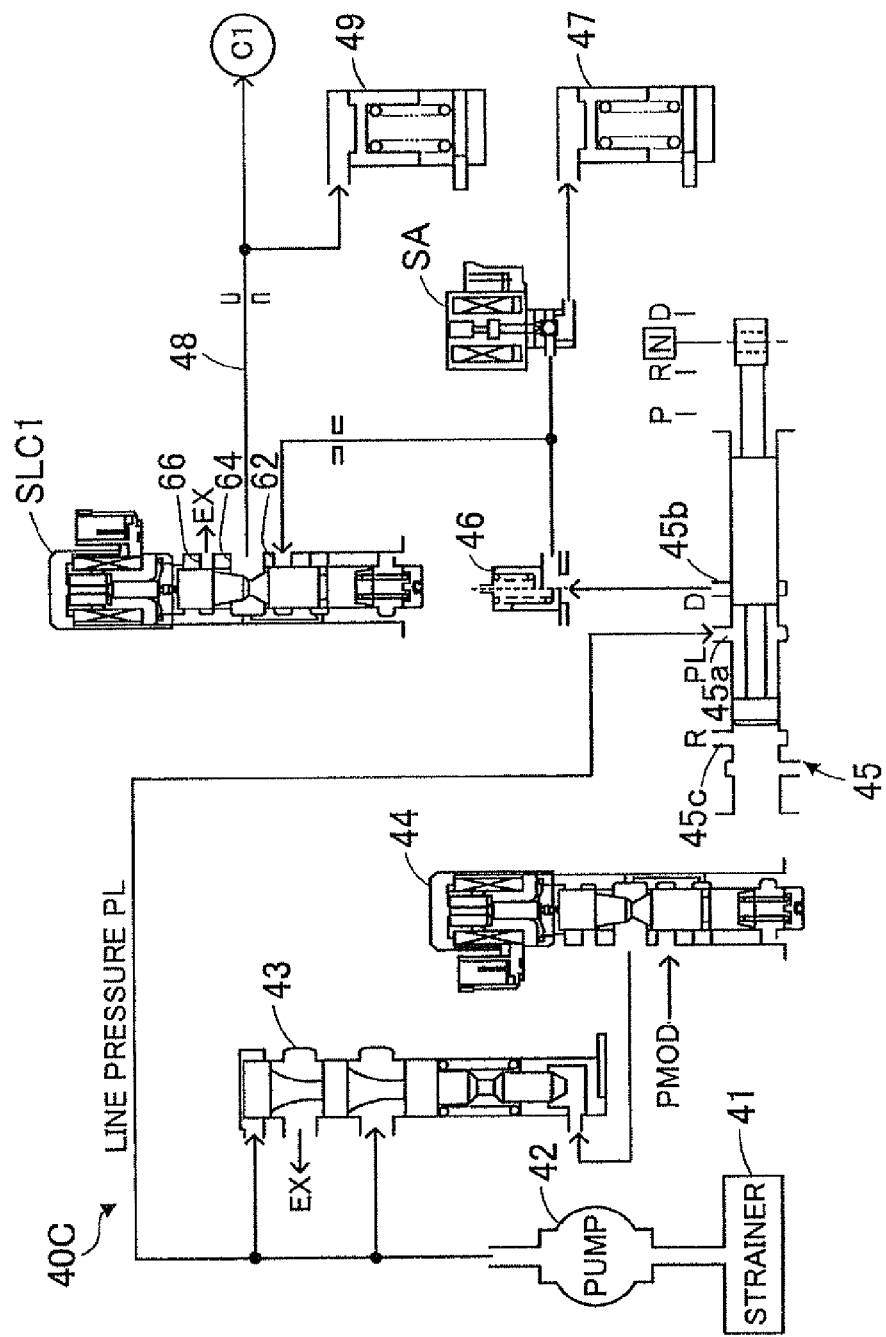
FIG. 13 shows a schematic configuration of a hydraulic circuit 40C according to another modification.

While the power transfer device 20 according to the embodiment is provided with the electromagnetic pump 70 which applies a hydraulic pressure to the clutch C1 in place of the mechanical oil pump 42 while the engine 12 is automatically stopped, the present invention is not limited thereto, and an electric oil pump 42B may be provided in place of the electromagnetic pump 70 as shown in a hydraulic circuit 40B according to a modification of FIG. 10. In the hydraulic circuit 40B according to the modification, in contrast to the hydraulic circuit 40 according to the embodiment, the switching valve 50 and the electromagnetic pump 70 are not provided, the output port 64 of the linear solenoid SLC1 is directly connected to the oil passage 48 for the clutch C1, and the electric oil pump 42B is provided in parallel with the mechanical oil pump 42. For the thus configured hydraulic circuit 40B according to the modification, an automatic stop control routine according to the modification of FIG. 11 is executed in place of the automatic stop control routine according to the embodiment of FIG. 6. In the automatic stop control routine according to the modification, the process waits for the automatic stop conditions for the engine 12 to be satisfied (step S300). An engine stop command is output (step S310). The electric oil pump 42B starts being driven (step S320). The learned hydraulic pressure value Lp (current command) is read (step S330). The linear solenoid SLC1 is driven on the basis of the read learned hydraulic pressure value Lp (step S340). When operation of the engine 12 is stopped, the mechanical oil pump 42 is also stopped. Therefore, the electric oil pump 42B is driven so that the hydraulic pressure pumped from the electric oil pump 42B is supplied to the clutch C1 via the linear solenoid SLC1. At this time, because the linear solenoid SLC1 is driven on the basis of the learned hydraulic pressure value Lp (current command), the clutch C1 can be caused to stand by at a hydraulic pressure around the stroke end pressure. Then, the process waits for the automatic start conditions for the engine 12 to be satisfied (step S350). An engine start command is output (step S360). The process waits for complete combustion to occur in the engine 12 and for rotation of the engine 12 to be stabilized (step S370). Application control in which the hydraulic pressure from the mechanical oil pump 42 which has been started is regulated by the linear solenoid SLC1 to gradually increase the hydraulic pressure to be supplied to the clutch C1 is executed (step S380). The electric oil pump 42B stops being driven (step S390). The routine is thus terminated.

FIG. 12 shows temporal changes in engine speed Ne, accelerator operation amount Acc, brake switch signal BSW, current command for the linear solenoid SLC1, drive command for the electric oil pump 42B, and hydraulic pressure of the clutch C1 (C1 pressure) according to the modification. The neutral control performed at times t21 to t24 is identical to the neutral control performed at times t11 to t14 of FIG. 9, and thus is omitted here. When the automatic stop conditions for the engine 12 are satisfied at time t25, the electric oil pump 42B starts being driven in place of the mechanical oil pump 42 which has been stopped, and the linear solenoid SLC1 is driven on the basis of the learned hydraulic pressure value Lp to cause the clutch C1 to stand by at a hydraulic pressure around the stroke end pressure. Then, when the automatic start conditions for the engine 12 are satisfied at time t26, the starter motor 13 is driven to start cranking the engine 12. When complete combustion occurs in the engine 12 (time t27) and rotation of the engine 12 is stabilized (time t28), application control in which the hydraulic pressure to be applied to the clutch C1 is gradually increased using the hydraulic pressure from the mechanical oil pump 42 which has been started is executed to completely engage the clutch C1, and the electric oil pump 42B stops being driven. Because application control is performed after rotation of the engine 12 is stabilized, torque variations due to initial combustion of the engine 12 are not transferred to the drive shaft 92 (wheels 96a and 96b). Thus, the modification can achieve the same effect as that achieved by the embodiment.

Figure 14:
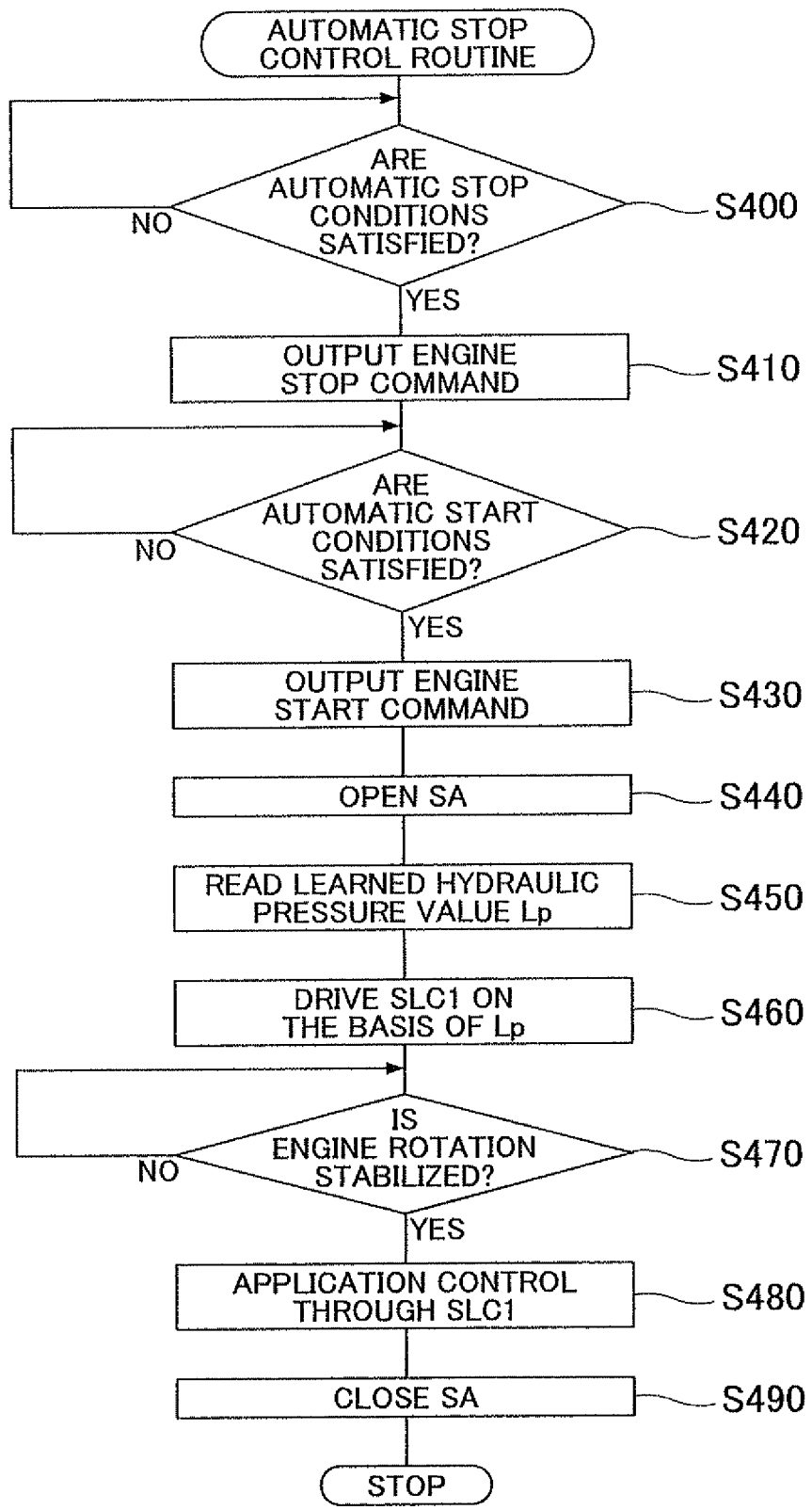
FIG. 14 is a flowchart showing an automatic stop control routine according to the modification.

While the power transfer device 20 according to the embodiment is provided with the electromagnetic pump 70 which applies a hydraulic pressure to the clutch C1 in place of the mechanical oil pump 42 while the engine 12 is automatically stopped, an accumulator 47 and an on/off solenoid SA may be provided in place of the electromagnetic pump 70 as shown in a hydraulic circuit 40C according to a modification of FIG. 10. In the hydraulic circuit 40C according to the modification, in contrast to the hydraulic circuit 40 according to the embodiment, the switching valve 50 and the electromagnetic pump 70 are not provided, the output port 64 of the linear solenoid SLC1 is directly connected to the oil passage 48 for the clutch C1, a check valve 46 is interposed between the D-position output port 45b of the manual valve 45 and the input port 62 of the linear solenoid SLC1 with the D-position output port 45b provided on the upstream side and with the input port 62 provided on the downstream side, and the accumulator 47 is disposed downstream of the check valve 46 via the on/off solenoid SA. For the thus configured hydraulic circuit 40C according to the modification, an automatic stop control routine according to the modification of FIG. 14 is executed in place of the automatic stop control routine according to the embodiment of FIG. 6. In the automatic stop control routine according to the modification, the process waits for the automatic stop conditions for the engine 12 to be satisfied (step S400). An engine stop command is output (step S410). Then, the process waits for the automatic start conditions for the engine 12 to be satisfied (step S420). When the automatic start conditions are satisfied, an engine start command is output (step S430). The learned hydraulic pressure value Lp is read (step S440). The linear solenoid SLC1 is driven on the basis of the read learned hydraulic pressure value Lp (current command) (step S450). The on/off solenoid SA is opened (step S440). Accordingly, the hydraulic pressure accumulated in the accumulator 47 is supplied to the clutch C1 via the linear solenoid SLC1. At this time, because the linear solenoid SLC1 is driven on the basis of the learned hydraulic pressure value Lp (current command), the clutch C1 is caused to stand by at a hydraulic pressure around the stroke end pressure. Then, the process waits for complete combustion to occur in the engine 12 and for rotation of the engine 12 to be stabilized (step S470). Application control in which the hydraulic pressure from the mechanical oil pump 42 which has been started is regulated by the linear solenoid SLC1 to gradually increase the hydraulic pressure to be applied to the clutch C1 is executed (step S480). The on/off solenoid SA is closed (step S490). The routine is thus terminated. When the engine 12 is started, the hydraulic pressure pumped from the mechanical oil pump 42 is accumulated in the accumulator 47 via the on/off solenoid SA. Thus, the pressure accumulation state of the accumulator 47 can be held by closing the on/off solenoid SA.

Figure 15:
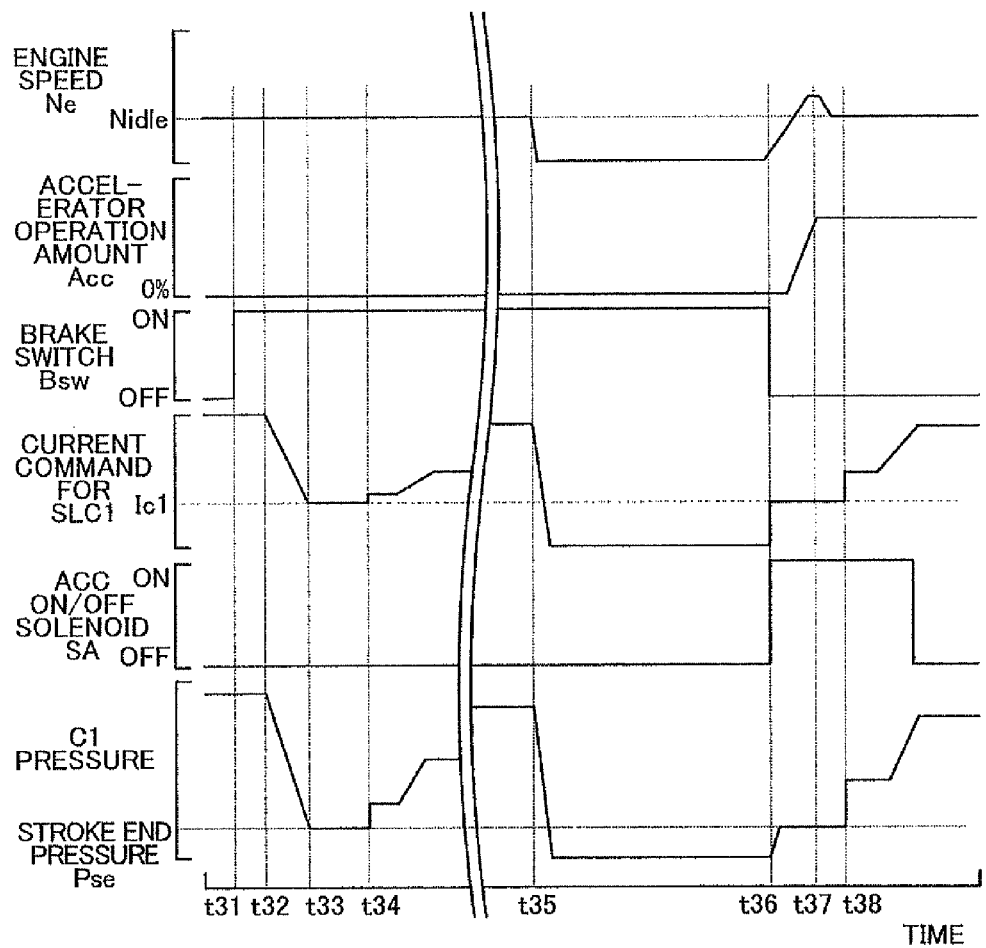
FIG. 15 shows temporal changes in engine speed Ne, accelerator operation amount Acc, brake switch signal BSW, current command for the linear solenoid SLC1, drive command for an ACC on/off solenoid SA, and hydraulic pressure of the clutch C1 (C1 pressure) according to the modification.

FIG. 15 shows temporal changes in engine speed Ne, accelerator operation amount Ace, brake switch signal BSW, current command for the linear solenoid SLC1, drive command for the on/off solenoid SA, and hydraulic pressure of the clutch C1 (C1 pressure) according to the modification. The neutral control performed at times t31 to t34 is identical to the neutral control performed at times t11 to t14 of FIG. 9, and thus is omitted here. When the automatic start conditions for the engine 12 are satisfied at time t36, the hydraulic pressure accumulated in the accumulator 47 is released by opening the on/off solenoid SA, and the linear solenoid SLC1 is driven on the basis of the learned hydraulic pressure value Lp (current command) to cause the clutch C1 to stand by at a hydraulic pressure around the stroke end pressure. Then, the starter motor 13 is driven to start cranking the engine 12. When complete combustion occurs in the engine 12 (time t37) and rotation of the engine 12 is stabilized (time t38), application control in which the hydraulic pressure to be applied to the clutch C1 is gradually increased using the hydraulic pressure from the mechanical oil pump 42 which has been started is executed to completely engage the clutch C1, and the on/off solenoid SA is closed. Because application control is performed after rotation of the engine 12 is stabilized, torque variations due to initial combustion of the engine 12 are not transferred to the drive shaft 92 (wheels 96a and 96b). Thus, the modification can achieve the same effect as that achieved by the embodiment.

The correspondence between the main elements of the embodiment and the main elements of the invention described in the "Summary of the Invention" section will be described. In the embodiment, the engine 12 corresponds to the "internal combustion engine". The automatic transmission 30 corresponds to the "power transfer mechanism". A system including the mechanical oil pump 42, the linear solenoid SLC1, and the switching valve 50 of the hydraulic circuit 40 corresponds to the "first fluid pressure actuator". A system including the electromagnetic pump 70 and the switching valve 50 of the hydraulic circuit 40 corresponds to the "second fluid pressure actuator". A system including the electric oil pump 42B and the linear solenoid SLC1 of the hydraulic circuit 40B and a system including the check valve 46, the accumulator 47, the on/off solenoid SA, and the linear solenoid SLC1 of the hydraulic circuit 40C also correspond to the "second fluid pressure actuator". The mechanical oil pump 42 corresponds to the "first pump". The linear solenoid SLC1 corresponds to the "pressure regulator". The electromagnetic pump 70 corresponds to the "second pump". The electric oil pump 42B also corresponds to the "second pump". The "internal combustion engine" is not limited to an internal combustion engine that outputs power on a hydrocarbon fuel such as gasoline and diesel oil, and may be any type of internal combustion engine such as a hydrogen engine. The "power transfer mechanism" is not limited to the automatic transmission 30 which is a 5-speed automatic transmission that provides first to fifth forward speeds, and may be an automatic transmission that provides any number of speeds such as 4 speeds, 6 speeds, and 8 speeds. The "power transfer mechanism" is not limited to an automatic transmission, and may be any mechanism that can transfer power from an internal combustion engine to an axle side via a friction engagement element, such as a mechanism connected to the crankshaft 14 of the engine 12 via a clutch and directly connected to the wheels 96a and 96b via the differential gear 94, for example. The "electromagnetic pump" is not limited to an electromagnetic pump that pumps a hydraulic fluid to the clutch C1 which establishes the first forward speed, and may be an electromagnetic pump that, when a shift speed for starting the vehicle is set to a shift speed other than the first forward speed, pumps hydraulic oil to a clutch and a brake that establish the shift speed for starting the vehicle (such as the second forward speed) that is set to start the vehicle in accordance with a command from a driver or the running state of the vehicle. In the embodiment, the "pressure regulator" is configured as a direct-control linear solenoid valve that generates an optimum clutch pressure from the line pressure PL to directly control the clutch C1. However, a linear solenoid may be used as a pilot-control linear solenoid to drive a separate control valve, which generates a clutch pressure for controlling the clutch C1. The correspondence between the main elements of the embodiment and the main elements of the invention described in the "Summary of the Invention" section does not limit the elements of the invention described in the "Summary of the Invention" section, because the embodiment is an example given for the purpose of specifically describing the mode described in the "Summary of the Invention" section. That is, the invention described in the "Summary of the Invention" section should be construed on the basis of the description in that section, and the embodiment is merely a specific example of the invention described in the "Summary of the Invention" section.

While the embodiment of the present invention has been described above, it is a matter of course that the present invention is not limited to the embodiment in any way, and that the present invention may be implemented in various forms without departing from the scope and sprit of the present invention.

The present invention may be applied to the automotive industry and so forth.

What is claimed is:

1. A power transfer mechanism control device controlling a power transfer mechanism which is mounted on a vehicle including an automatically stoppable and automatically startable internal combustion engine and which transfers power from the internal combustion engine to an axle side via a friction engagement element actuated by a fluid pressure from either of a first fluid pressure actuator driven by the power from the internal combustion engine and a second fluid pressure actuator driven by a fluid pressure source different from a fluid pressure source for the first fluid pressure actuator, wherein
in the case where the internal combustion engine which has been automatically stopped is to be automatically started, the second fluid pressure actuator is controlled such that, before complete combustion occurs in the internal combustion engine, the friction engagement element stands by in a low-pressure state in which a fluid pressure is lower than a fluid pressure at which torque is transferred, and the first fluid pressure actuator is controlled such that the friction engagement element transfers the torque at predetermined timing after the complete combustion occurs in the internal combustion engine.

2. The power transfer mechanism control device according to claim 1, wherein
the first fluid pressure actuator is controlled so as to start increasing a fluid pressure to be supplied to a fluid pressure servo for the friction engagement element at the predetermined timing when a rotation of the internal combustion engine is stabilized after the internal combustion engine is automatically started.

3. The power transfer mechanism control device according to claim 2, wherein
the first fluid pressure actuator is controlled so as to start increasing the fluid pressure to be supplied to the fluid pressure servo for the friction engagement element when, as the predetermined timing, a predetermined period of time has elapsed after the internal combustion engine is automatically started.

4. The power transfer mechanism control device according to claim 2, wherein
the first fluid pressure actuator is controlled so as to start increasing the fluid pressure to be supplied to the fluid pressure servo for the friction engagement element when, as the predetermined timing, an amount of a temporal change in a rotational speed of the internal combustion engine has converged to a predetermined range after the internal combustion engine is automatically started.

5. The power transfer mechanism control device according to claim 1, wherein
the first fluid pressure actuator is an actuator including a first pump actuated by the power from the internal combustion engine to generate a fluid pressure, and a pressure regulator that regulates the fluid pressure from the first pump to supply the regulated fluid pressure to the fluid pressure servo for the friction engagement element, and
the second fluid pressure actuator is an actuator including a second pump actuated by supply of electric power to generate a fluid pressure and to supply the generated fluid pressure to the fluid pressure servo for the friction engagement element.

6. The power transfer mechanism control device according to claim 5, further comprising:
a switch actuated by the fluid pressure from the first pump to switch between a state in which connection is established between an output port of the pressure regulator and the fluid pressure servo for the friction engagement element and a state in which such connection is blocked, wherein
while the internal combustion engine is automatically stopped, the second fluid pressure actuator is controlled such that the friction engagement element stands by in the low-pressure state and the pressure regulator is caused to stand by with the same control amount as a control amount for the second fluid pressure actuator, and when the internal combustion engine is automatically started, the pressure regulator is driven such that the hydraulic pressure to be applied to the fluid pressure servo for the friction engagement element is increased at the predetermined timing after the complete combustion occurs in the internal combustion engine.

7. The power transfer mechanism control device according to claim 5, wherein
the second pump is an electromagnetic pump that reciprocates a piston by repeatedly turning on and off an electromagnetic force to generate a fluid pressure.

8. The power transfer mechanism control device according to claim 1, wherein
the first fluid pressure actuator is an actuator including a first pump actuated by the power from the internal combustion engine to generate a fluid pressure, and a pressure regulator that regulates the fluid pressure from the first pump to supply the regulated fluid pressure to the fluid pressure servo for the friction engagement element, and
the second fluid pressure actuator is an actuator including a third pump connected in parallel with the first pump and actuated by supply of electric power, and the pressure regulator which is used in common with the first fluid pressure actuator and which regulates a fluid pressure from the third pump to supply the regulated fluid pressure to the fluid pressure servo for the friction engagement element.

9. The power transfer mechanism control device according to claim 1, wherein
the first fluid pressure actuator is an actuator including a first pump actuated by the power from the internal combustion engine to generate a fluid pressure, and a pressure regulator that regulates the fluid pressure from the first pump to supply the regulated fluid pressure to the fluid pressure servo for the friction engagement element, and
the second fluid pressure actuator is an actuator including an electromagnetic valve and a pressure accumulator connected to a flow passage between the pressure regulator and the first pump via the electromagnetic valve.

10. The power transfer mechanism control device according to claim 1, wherein
during neutral control performed while the internal combustion engine is in operation, a neutral control amount, which is a control amount by which the friction engagement element is caused to stand by in a neutral state with pressure lower than a complete engagement pressure, is set on the basis of a power transfer state of the power transfer mechanism to control the first fluid pressure actuator, and learned, and
while the internal combustion engine is automatically stopped, the second fluid pressure actuator is controlled using the learned neutral control amount such that the friction engagement element stands by in the low-pressure state.

11. The power transfer mechanism control device according to claim 10, wherein
in the case where the internal combustion engine which has been automatically stopped is to be automatically started, the first fluid pressure actuator is controlled such that a standby pressure established by the second fluid pressure actuator is held until the predetermined timing after the complete combustion occurs in the internal combustion engine.

12. A power transfer device comprising:
a power transfer mechanism which is mounted on a vehicle including an automatically stoppable and automatically startable internal combustion engine and which transfers power from the internal combustion engine to an axle side via a friction engagement element actuated by a fluid pressure from either of a first fluid pressure actuator driven by the power from the internal combustion engine and a second fluid pressure actuator driven by a fluid pressure source different from a fluid pressure source for the first fluid pressure actuator; and
the control device according to claim 1 which controls the power transfer mechanism.

* * * * *